United States Patent
Hiramatsu et al.

(10) Patent No.: US 8,580,009 B2
(45) Date of Patent: Nov. 12, 2013

(54) HONEYCOMB FILTER

(75) Inventors: Takuya Hiramatsu, Nagoya (JP);
Fumiharu Sato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 180 days.

(21) Appl. No.: 13/043,921

(22) Filed: Mar. 9, 2011

(65) Prior Publication Data

US 2011/0219736 A1    Sep. 15, 2011

(30) Foreign Application Priority Data

Mar. 12, 2010   (JP) .................................. 2010-055866

(51) Int. Cl.
| | | |
|---|---|---|
| *B01D 39/14* | (2006.01) | |
| *B01D 39/06* | (2006.01) | |
| *B01D 24/00* | (2006.01) | |
| *B01D 50/00* | (2006.01) | |

(52) U.S. Cl.
USPC ................. 55/523; 55/522; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS

| | | |
|---|---|---|
| 5,114,581 A | 5/1992 | Goldsmith et al. |
| 5,221,484 A | 6/1993 | Goldsmith et al. |
| 2004/0045267 A1* | 3/2004 | Ichikawa et al. ................ 55/523 |
| 2009/0011180 A1 | 1/2009 | Ichikawa |
| 2010/0058725 A1* | 3/2010 | Konomi et al. .................. 55/523 |
| 2010/0126133 A1* | 5/2010 | Fekety et al. .................... 55/523 |
| 2010/0135866 A1* | 6/2010 | Mizuno et al. ................ 422/180 |

FOREIGN PATENT DOCUMENTS

| | | |
|---|---|---|
| EP | 1 839 748 A2 | 10/2007 |
| EP | 1 974 791 A1 | 10/2008 |
| EP | 1 997 599 A1 | 12/2008 |
| JP | 10-249124 A1 | 9/1998 |
| JP | 3261382 B2 | 12/2001 |
| JP | 2607898 Y2 | 1/2007 |

* cited by examiner

*Primary Examiner* — Amber Orlando
(74) *Attorney, Agent, or Firm* — Burr & Brown

(57) ABSTRACT

There is provide a honeycomb filter which can suppress generation of cracks in plugged portions due to heat generated by burning of a PM during regeneration and comprises a honeycomb basal body including porous partition walls arranged to form a plurality of cells disposed in parallel with one another and including inflow cells and outflow cells which are formed adjacent to the inflow cells; first plugged portions with which one end of each of the inflow cells is plugged; second plugged portions with which another end of each of the outflow cells is plugged; porous collecting layers formed on the inflow-cells side surfaces of the partition walls; and end aggregate layers made of a particulate aggregate material and formed on the inflow-cells-side surfaces of the first plugged portions, and a thickness of the end aggregate layers is from 0.5 to 5 mm.

4 Claims, 3 Drawing Sheets

HONEYCOMB FILTER

BACKGROUND OF THE INVENTION

1. Field of the Invention

The present invention relates to a honeycomb filter, and more particularly, it relates to a honeycomb filter which can suppress generation of cracks in plugged portions due to heat generated by burning of a PM during regeneration.

2. Description of the Related Art

In consideration of an impact on environment, there is an increasing need to remove, from an exhaust gas, a particulate matter included in the exhaust gas discharged from an internal combustion engine such as an engine for an automobile, an engine for a construction machine or an engine installed for an industrial machine, another combustion apparatus or the like. In particular, regulations on the removal of the particulate matter (referred to also as PM) discharged from a diesel engine tend to be strengthened worldwide. In such situations, a diesel particulate filter (DPF) for collecting and removing the PM has been gotten much attention.

As one embodiment of the DPF, there is a honeycomb filter comprising porous partition walls arranged to form a plurality of cells constituting through channels for a fluid, and predetermined cells each having one end opened as well as another end plugged and the remaining cells each having one end plugged as well as another end opened are alternately arranged. In this honeycomb filter, the fluid (the exhaust gas) which has flowed into the cells through opened one end of the predetermined cells penetrates through the partition walls to flow out of the partition walls as the penetrating fluid toward the remaining cells, and further flows out of the remaining cells through the opened another end thereof. When the exhaust gas penetrates through the partition walls, the PM included in the exhaust gas is collected and removed. In such a honeycomb filter (a wall flow type filter) having a structure in which the exhaust gas penetrates through the porous partition walls, the filter can cover a much filtering area. Therefore, the filter can reduce a filtering flow speed (a partition wall penetrating flow speed), and have a small pressure drop and a comparatively satisfactory particulate matter collecting efficiency.

However, the DPF to which this honeycomb filter is applied has problems as follows. When the PM is collected in a clean state, the state first shifts to a depth filtration state where the PM penetrates into pores of the porous partition walls to be collected therein, and a surface filtration state where the PM is collected on the surfaces of the partition walls. When the PM is deposited on the surfaces of the partition walls, the state next shifts to a cake filtration state where the PM forms a layer to perform a function of a filter. In such filtration processes, the PM is deposited in (the pores of) the partition walls in an initial depth filtration process. Therefore, a substantive porosity of the partition walls lowers immediately after start of the PM collection, and the flow speed of the exhaust gas penetrating through the partition walls lowers to make the pressure drop increase rapidly. This has caused deterioration of an engine performance.

It has been disclosed that to prevent the insides of the partition walls from being clogged with the PM, a membrane made of a porous material having a smaller average particle diameter than a porous material constituting the partition walls is formed on the surfaces of the partition walls on the side of inflow cells, to separate a filtering fluid from a filter cake containing fine particles (e.g., see Patent Documents 1 and 2). Moreover, a manufacturing method of a filter element provided with such a filter layer is disclosed (e.g., see Patent Document 3). It is to be noted that in the present description, these membranes or filter layers will be referred to as a collecting layer.

[Patent Document 1] JP-U-2607898
[Patent Document 2] JP-B-3261382
[Patent Document 3] JP-A-H10-249124

SUMMARY OF THE INVENTION

In a case where collecting layers are formed on the surfaces of partition walls on the side of inflow cells, the amount of a PM to be deposited till reaching the same pressure drop can be increased as compared with a case where any collecting layer is not formed, whereby the number of regeneration treatment times can be decreased. However, when the amount of the PM to be deposited increases, the amount of the PM to be burnt during regeneration also increases, the amount of generated heat increases, and hence a DPF has a high temperature. Especially from the ends of the inflow cells to ends of outflow cells in the DPF, the temperature rises toward the ends of the outflow cells, and hence cracks are easily generated in plugged portions at the ends of the outflow cells.

The present invention has been developed in view of such problems of conventional technologies, and an object thereof is to provide a honeycomb filter which is provided with collecting layers can suppress generation of cracks in plugged portions at ends of outflow cells.

The present inventors have intensively carried out investigations to achieve the above object, and have eventually found that when end aggregate layers made of a particulate aggregate material and having a thickness of 0.5 to 5 mm are formed on the inflow-cell-side surfaces of first plugged portions for plugging one end of each inflow cell into which a fluid can flow, the above object can be achieved, thereby completing the present invention.

That is, according to the present invention, there is provided a honeycomb filter shown below.

[1] A honeycomb filter comprising: a honeycomb basal body including porous partition walls arranged to form a plurality of cells disposed in parallel with one another and including inflow cells into which a fluid flows and outflow cells which are formed adjacent to the inflow cells and out of which the fluid flows; first plugged portions with which one end of each of the inflow cells is plugged; second plugged portions with which another end of each of the outflow cells is plugged; porous collecting layers formed on the surfaces of the partition walls on the side of the inflow cells; and end aggregate layers made of a particulate aggregate material and formed on the surfaces of the first plugged portions on the side of the inflow cells, wherein a thickness of the end aggregate layers is from 0.5 to 5 mm.

[2] The honeycomb filter according to the above [1], wherein a porosity of the end aggregate layers is from 30 to 75%.

[3] The honeycomb filter according to the above [1] or [2], wherein the honeycomb basal body comprises a plurality of honeycomb segments each including a cell structure having the porous partition walls arranged to form the plurality of cells and an outer wall disposed in an outer periphery of the cell structure, and is a joined body of the honeycomb segments which are joined at the adjacent outer walls one another.

A honeycomb filter of the present invention has such an effect that it is possible to suppress generation of cracks in plugged portions due to heat generated by burning of a PM during regeneration.

DETAILED DESCRIPTION OF THE INVENTION

Hereinafter, an embodiment for carrying out the present invention will be described, but the present invention is not limited to the following embodiment. It should be understood that the following embodiment which is appropriately subjected to alteration, improvement or the like based on the ordinary knowledge of a person with ordinary skill without departing from the scope of the present invention is also contained in the present invention.

Figure 1:
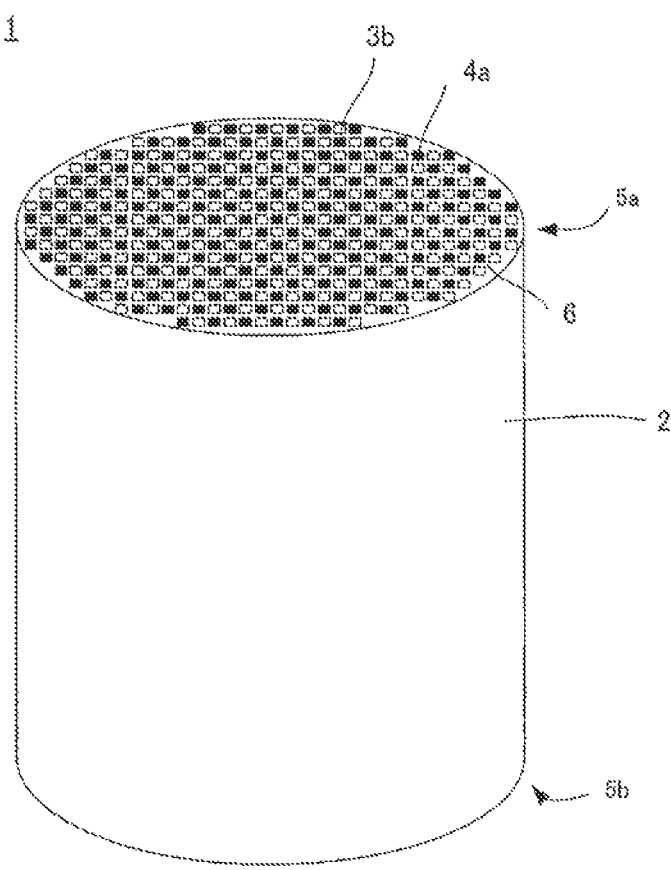
FIG. 1 is a perspective view showing one embodiment of a honeycomb filter according to the present invention.

As shown in FIG. 1, a honeycomb filter 1 according to the present invention comprises a honeycomb basal body 2 and second plugged portions 3b. Moreover, though not shown, porous collecting layers are formed on the surfaces of porous partition walls 6 on the side of inflow cells 4a, and one end 5b of each of outflow cells is plugged with first plugged portions. Furthermore, through not shown, on the surfaces of the first plugged portions on the side of the inflow cells 4a, end aggregate layers made of a particulate aggregate material and having a thickness of 0.5 to 5 mm are formed. In FIG. 1, the honeycomb filter 1 has a columnar shape, but the shape of the honeycomb filter of the present invention is not limited to this shape, and an arbitrary shape can appropriately be formed in accordance with usage.

Figure 2:
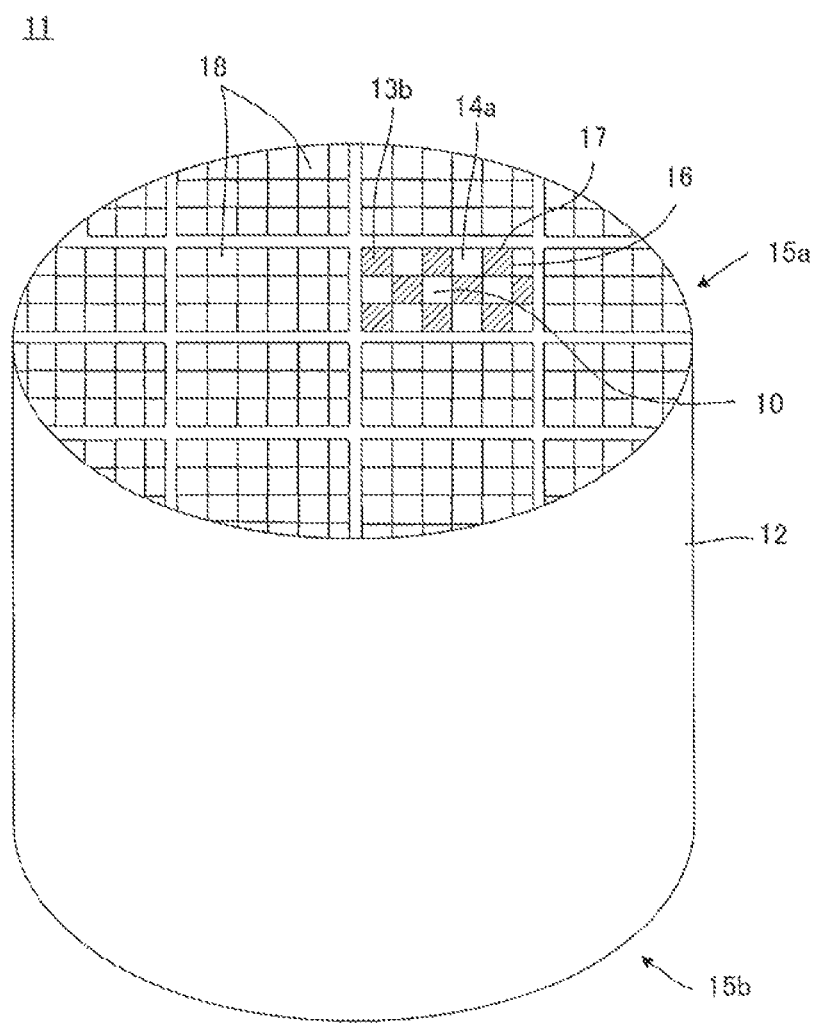
FIG. 2 is a perspective view showing another embodiment of the honeycomb filter according to the present invention.

Moreover, as shown in FIG. 2, in a honeycomb filter 11 according to the present invention, a honeycomb basal body 12 is preferably comprises a plurality of honeycomb segments 18 each including a cell structure 10 having porous partition walls 16 arranged to form a plurality of cells and an outer wall 17 disposed in an outer periphery of the cell structure 10, and is a joined body of the honeycomb segments 18 which are joined at the adjacent outer walls 17 one another. In this way, the honeycomb basal body 12 is the joined body of the plurality of honeycomb segments 18 having the outer walls 17 joined to one another, whereby a heat stress is absorbed. Therefore, it is possible to suppress generation of cracks, in a case where the filter is exposed to a rapid temperature change of an exhaust gas or locally generated heat to cause a non-uniform temperature distribution therein.

Figure 3:
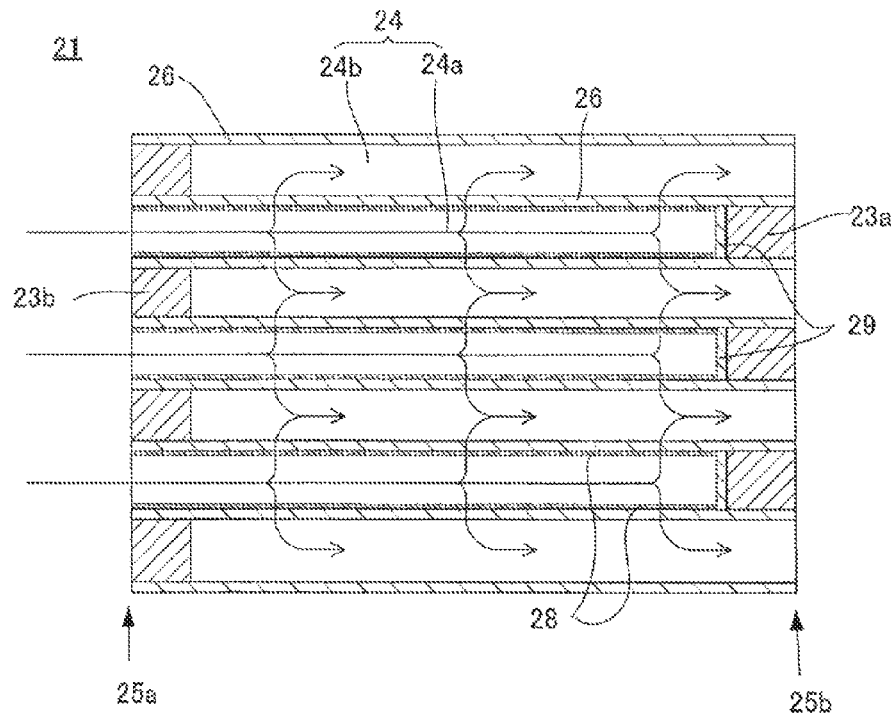
FIG. 3 is a sectional view in a direction of fluid, showing flow of a fluid in the honeycomb filter according to the present invention.

A honeycomb filter 21 according to the present invention has a structure in which, as shown in FIG. 3, when the filter is used as a DPF, an exhaust gas flows into the inflow cells 24a, passes through the porous collecting layers 28 and the porous partition walls 26 at least once, and is allowed to flow out of the outflow cells 24b. A PM included in the exhaust gas is collected on the surface of the porous collecting layers 28, whereby the porous partition wall 26 is not clogged with any PM. Therefore, rapid initial rise of a pressure drop can be suppressed. Moreover, the filter comprises end aggregate layers 29, whereby a large amount of deposited PM does not directly come in contact with first plugged portions 23a. Therefore, when the PM is burnt, the generation of the cracks in the first plugged portions 23a can be suppressed.

1. Honeycomb Basal Body

A honeycomb basal body includes porous partition walls arranged to form a plurality of cells disposed in parallel with one another and including inflow cells into which a fluid can flow and outflow cells which are formed adjacent to the inflow cells and out of which the fluid can flow. In the present description, in a stage of the honeycomb basal body, the fluid cannot penetrate through the partition walls, and the first and second plugged portions are not formed. Therefore, the inflow cells into which the fluid can flow cannot be distinguished from the outflow cells out of which the fluid can flow. However, when the honeycomb basal body becomes the honeycomb filter later, the cells corresponding to the inflow cells and outflow cells are referred to as the inflow cells and outflow cells of the honeycomb basal body.

Moreover, the honeycomb basal body preferably comprises a plurality of honeycomb segments each including a cell structure having porous partition walls arranged to form a plurality of cells and an outer wall disposed in an outer periphery of the cell structure, and is the joined body of the honeycomb segments which are joined at the adjacent outer walls each other via a joining material. In this way, the honeycomb basal body is the joined body of the plurality of honeycomb segments having the outer walls joined to one another, whereby a heat stress is absorbed. It is possible to suppress generation of cracks, in a case where the filter is exposed to a rapid temperature change of an exhaust gas or locally generated heat to cause a non-uniform temperature distribution therein.

There is not any special restriction on a material of the partition walls constituting the honeycomb basal body, but from the viewpoint of excellent thermal stability during use at a high temperature, the material preferably contains, as a main component, at least one material selected from the group consisting of cordierite, Si-bond SiC, recrystallized SiC, aluminum titanate, mullite, silicon nitride, sialon, zirconium phosphate, zirconia, titania, alumina, and silica.

The average pore diameter of the partition walls is preferably from 10 to 30 µm, and further preferably from 12 to 25 µm. If the average pore diameter is smaller than 10 µm, the pressure drop of the honeycomb filter itself increases sometimes. On the other hand, if the average pore diameter exceeds 30 µm, owing to the large average pore diameter, the honeycomb filter does not sufficiently perform a function thereof sometimes, or the strength of the filter itself becomes insufficient sometimes. Moreover, when the collecting layers are formed on the surfaces of the partition walls and there is a difference between the average particle diameter of aggregate particles constituting the collecting layers and the average pore diameter of the partition walls, the collecting layers cannot be formed sometimes. It is to be noted that the average pore diameter of the partition walls and a porosity of the partition walls described later can be measured by, for example, mercury intrusion technique using "Porosimeter Model 9810 (trade name)" manufactured by Shimadzu Corporation.

Moreover, the porosity of the partition walls is preferably 35% or more and less than 70%. If the porosity is less than 35%, the pressure drop of the honeycomb filter itself increases sometimes. On the other hand, if the porosity is 70% or more, the amount of the aggregate particles to be used for forming the collecting layers increases sometimes, or the strength of the filter itself becomes insufficient sometimes.

The thickness of the partition walls is preferably from 200 to 600 µm. If the thickness of the partition walls is increased, a collecting efficiency improves, but an initial pressure drop increases. On the other hand, if the thickness is excessively decreased, strength becomes inadequate, thereby causing a problem of durability. It is to be noted that the thickness of the partition walls can be measured by measuring the section of each partition wall with, for example, an image analysis device. Alternatively, the thickness may be obtained by analyzing the image of the partition wall obtained by a scanning electron microscope (hereinafter referred to as "SEM").

The cell density of the honeycomb basal body is preferably from 15 to 65 cells/cm$^2$. The pressure drop during deposition of a PM is decreased, as a filtering area is large. Therefore, if the cell density is larger, the pressure drop during the deposition of the PM decreases. On the other hand, the initial pressure drop can be increased by decreasing the hydraulic diameter of each cell. In consequence, from the viewpoint of the decrease of the initial pressure drop, the cell density is preferably small. It is to be noted that the hydraulic diameter is a value calculated by 4×(sectional area)/(peripheral length) based on the sectional area of the cell (space) (the area of the space formed in the section of the honeycomb basal body which is vertical in a central axis direction) and the peripheral length.

There is not any special restriction on the shape of the section of the cell which is vertical in the central axis direction of the honeycomb basal body. It is possible to form any shape, for example, a polygonal shape such as a triangular shape, a quadrangular shape or a hexagonal shape; a combination of an octagonal shape and a quadrangular shape; a round shape; an elliptic shape; a racing track shape; one of these shapes which are partially changed or the like. From the viewpoint of ease of preparation, a preferable shape is the triangular shape, the quadrangular shape, the hexagonal shape, or the combination of the octagonal shape and the quadrangular shape. When the shape of the combination of the octagonal shape and the quadrangular shape is applied to, octagonal cells are disposed on the side of a fluid inlet, whereby the surface area of the cells on the fluid inlet side can be enlarged to increase the amount of the PM to be collected.

2. First and Second Plugged Portions:

One end of each inflow cell is plugged with the first plugged portion, and another end of each outflow cell is plugged with the second plugged portion. Since the inflow cells are disposed adjacent to the outflow cells, one end and another end of the cells of the honeycomb filter are alternately plugged to form a checkered pattern. Therefore, the fluid (the exhaust gas) which has flowed into the inflow cell through another opened end thereof penetrates through the partition wall at least once, and then flows out of the outflow cell through the one opened end thereof.

There is not any special restriction on the material of the plugged portions, and a material similar to the material of the partition walls may be used. Above all, the same material as that of the partition walls is preferably used from the viewpoint of the suppression of the generation of the cracks due to a difference in a thermal expansion coefficient.

The thickness of the plugged portions is preferably from 1 to 15 mm, and further preferably from 1.5 to 11 mm. If the thickness is less than 1 mm, the fluid penetrates through the plugged portions sometimes, or the plugged portions break down sometimes owing to weak adherence to the partition walls. On the other hand, if the thickness exceeds 15 mm, the filtering area decreases, and hence the pressure drop increases sometimes.

3. Porous Collecting Layer:

The collecting layer is a layer formed on the surfaces of the partition walls on the side of the inflow cells and made of aggregate particles having an average particle diameter which is smaller than that of material particles constituting the partition walls. The honeycomb filter of the present invention, which is provided with such collecting layers, has a satisfactory PM collecting efficiency, and can suppress a rapid rise of the pressure drop immediately after start of the collection of the PM (initial PM deposition) and decrease the pressure drop during the deposition of the PM.

There is not any special restriction on the aggregate particles constituting the collecting layers, and a material similar to that of the partition walls may be used. However, the aggregate particles containing, as a main component, the same material as the material of the partition walls are preferably used so that the collecting layers do not peel owing to the difference in the thermal expansion coefficient. Moreover, the average particle diameter of the aggregate particles is preferably from 1 to 15 μm, and further preferably from 3 to 10 μm. If the average particle diameter of the aggregate particles exceeds 15 μm, the peak pore diameter of the collecting layers increases, and the decrease of the pressure drop during the initial deposition of the PM becomes insufficient sometimes.

Figure 4:
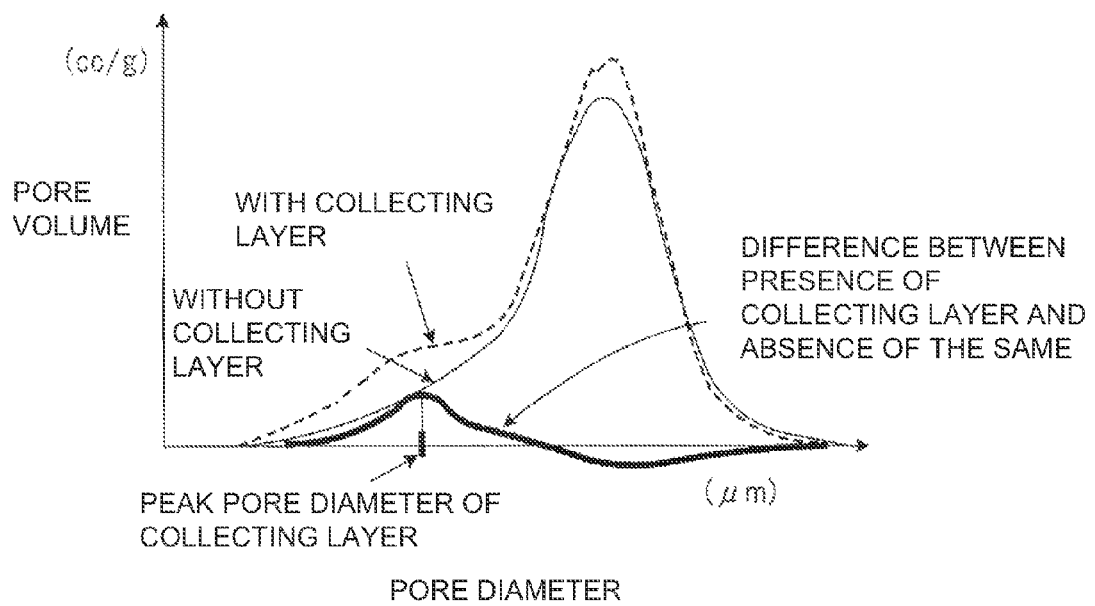
FIG. 4 is a chart showing a pore distribution required by mercury intrusion technique in the honeycomb filter according to the present invention.

The peak pore diameter of the collecting layer is preferably from 1 to 10 μm, and further preferably from 2 to 8 μm. If the peak pore diameter is less than 1 μm, the pressure drop in an initial stage where any PM is not deposited becomes excessively large sometimes. On the other hand, if the peak pore diameter exceeds 10 μm, the PM passes through the collecting layers to penetrate into the partition walls. Therefore, the rapid rise of the pressure drop immediately after the start of the PM collection cannot sufficiently be suppressed, and the function of the collecting layer is not performed sometimes. It is to be noted that the peak pore diameter is a pore diameter of the peak of a pore distribution. Specifically, as shown in FIG. 4, a difference between the measurement result of the pore distribution of the partition walls provided with the collecting layers and the measurement result of the pore distribution of the only partition walls is regarded as the pore distribution of the collecting layers, and the pore diameter of the peak thereof is the peak pore diameter. The pore distribution and the porosity described later can be measured by mercury intrusion technique using "Porosimeter Model 9810 (trade name)" manufactured by Shimadzu Corporation.

Moreover, the porosity of the collecting layer is preferably from 40% to 90%, and further preferably from 50 to 90%. If the porosity is less than 40%, the pressure drop in the initial stage where any PM is not deposited becomes excessively large sometimes. On the other hand, if the porosity exceeds 90%, the problem of the durability of the collecting layer occurs sometimes.

Furthermore, the thickness of the collecting layer needs to be set to be a preferable thickness in accordance with the porosity and peak pore diameter of the collecting layer. When the collecting layer has a large peak pore diameter or porosity, the PM easily passes through the collecting layer, whereby the thickness of the collecting layer needs to be increased. Moreover, when the collecting layer has a small peak pore diameter or porosity, the PM does not easily pass through the collecting layer. Therefore, even if the collecting layer has a small thickness, the collecting layer can sufficiently collect the PM. Furthermore, in any of these cases, if the thickness of the collecting layer is excessively increased, the penetration resistance of the collecting layer itself increases, and the pressure drop of the honeycomb filter might increase. Therefore, it is necessary to appropriately determine a necessary thickness in accordance with the structure of the collecting layer. Specifically, the thickness is preferably from 10 to 100 μm. It is to be noted that the thickness of the collecting layer can be obtained by performing the image analysis of the image of the partition wall provided with the collecting layer obtained by the SEM. Specifically, three images of the sectional structure of the collecting layer are picked with a magnification of 500 times, the thickness of the collecting layer is measured by the image analysis of three portions of each of the obtained images, and the average value of the thicknesses of the collecting layers in nine portions in total is calculated, to obtain the thickness of the collecting layer.

4. End Aggregate Layer:

The end aggregate layer is formed on the surface of each first plugged portion on the inflow cell side, made of a particulate aggregate material, and has a thickness of 0.5 to 5 mm. Since the honeycomb filter of the present invention is provided with the end aggregate layer, the collected PM does not directly come in contact with the first plugged portion. Therefore, even when the PM is burnt, it is possible to suppress rapid conduction of heat to the first plugged portion to prevent generation of cracks.

There is not any special restriction on the particulate aggregate material of the end aggregate layer, and aggregate particles similar to those of the collecting layer may be used. Above all, from the viewpoint of simplification of manufacturing steps, the same particulate aggregate material as that of the collecting layer is preferably used. Moreover, the average particle diameter of the particulate aggregate material is preferably from 1 to 15 μm, and further preferably from 3 to 10 μm. If the average particle diameter of the particulate aggregate material exceeds 15 μm, the end aggregate layer becomes thick sometimes.

The thickness of the end aggregate layer is from 0.5 to 5 mm, preferably from 0.5 to 4.5 mm, and further preferably from 0.6 to 4.3 mm. If the thickness of the end aggregate layer is less than 0.5 mm, during the burning of the PM, a space between the collected PM and the first plugged portion is sometimes too close. Therefore, an effect of suppressing the conduction of the heat becomes insufficient, and cracks are generated sometimes. On the other hand, if the thickness exceeds 5 mm, a filtering area decreases. Therefore, the pressure drop rapidly increases sometimes, as the amount of the deposited PM is large. It is to be noted that the thickness of the end aggregate layer can be measured by using an SEM or a microscope.

The porosity of the end aggregate layer is preferably from 30 to 75%, and further preferably from 40 to 70%. If the porosity of the end aggregate layer is less than 30%, the conduction of the heat through the end aggregate layer becomes good. Therefore, the effect of suppressing the heat becomes insufficient sometimes. On the other hand, if the porosity exceeds 75%, the volume of the end aggregate layer increases, and the filtering area decreases. Therefore, when the amount of the deposited PM is large, the pressure drop rapidly increases sometimes. It is to be noted that the porosity of the end aggregate layer can be calculated from an area ratio of a particle portion and a pore portion of an image of a deposited part, when the image is obtained by using the SEM and divided into those portions.

(Manufacturing Method)

For example, when Si-bond SiC is used as the material of the honeycomb basal body, a joined body is usually used as the honeycomb basal body. The joined body comprises a plurality of honeycomb segments each including a cell structure having porous partition walls arranged to form a plurality of cells and an outer wall disposed in an outer periphery of the cell structure, and the adjacent honeycomb segments have the outer walls joined to each other via a joining material. In this case, first, SiC powder and metal Si powder are mixed at a mass ratio of 80:20, and methyl cellulose, hydroxypropoxyl methyl cellulose, a pore former, a surfactant, water and the like are added thereto, and kneaded to obtain a kneaded clay having plasticity. Next, the clay is extruded by using a predetermined die, to form the honeycomb segment having a desirable shape.

Moreover, for example, when cordierite is used as the material of the honeycomb basal body, an integrally formed honeycomb basal body having a single cell structure is usually used. In this case, first, a dispersion medium such as water, and a pore former are added to a cordierite forming raw material, and an organic binder and a dispersant are further added thereto, and kneaded, to obtain a paste-like clay. Next, the clay is extruded by using a predetermined die, to form the honeycomb basal body having a desirable shape.

There is not any special restriction on means for kneading the material of the honeycomb basal body to prepare the clay, and examples of the means include methods using a kneader, a vacuum clay kneader and the like. Moreover, as a forming method, it is possible to preferably use a method of performing the extrusion forming of the clay prepared as described above, by use of a die having a desirable cell shape, partition wall thickness and cell density. Hereinafter, the extrusion-formed honeycomb segment or honeycomb basal body having the desirable shape will be generically referred to as "the honeycomb formed body".

Subsequently, the honeycomb formed body is dried by a microwave drier, further completely dried by a hot air drier, plugged, and then fired. "The firing" mentioned herein include both calcinating and firing. Examples of a plugged portion forming method include a method as follows. First, a plugging slurry is stored in a storage container. Subsequently, the end of the body provided with a mask is immersed into the storage container, to fill the plugging slurry into open frontal areas of cells which are not provided with any mask, thereby forming plugged portions. Another end of the body is immersed into the storage container, while the cells each having plugged one end are provided with the mask, to fill the plugging slurry into the open frontal areas of the cells which are not provided with any mask, thereby forming plugged portions. In consequence, another end of each cell having the one end which is not plugged is plugged, whereby in both the ends of the body, the cells are alternately plugged to form a checkered pattern. It is to be noted that when a material having a composition similar to that of the fired honeycomb formed body is used as a plugging material, an expansion coefficient becomes equal to that of the honeycomb formed body, which preferably results in improvement of durability.

The calcinating is performed, for the purpose of degreasing, for example, under an oxidation atmosphere at 550° C. for about three hours, but is preferably performed in accordance with an organic material (the organic binder, the dispersant, the pore former or the like) included in the honeycomb formed body. In general, the burning temperature of the organic binder is from about 100 to 300° C., and the burning temperature of the pore former is from about 200 to 800° C. Therefore, a calcinating temperature may be from about 200 to 1000° C. There is not any special restriction on the calcinating time, but the time is usually from about 3 to 100 hours.

Furthermore, the firing is performed. This firing is an operation of sintering the forming material in the calcinated honeycomb formed body to acquire a predetermined strength. Firing conditions (atmosphere, temperature, and time) vary in accordance with the type of the material of the honeycomb basal body, and hence appropriate conditions may be selected in accordance with the type of the material. For example, when Si-bond SiC is fired, the firing is performed under Ar inert atmosphere, and the firing temperature is from about 1400 to 1500° C.

Next, the aggregate particles constituting the collecting layer are supplied into the honeycomb formed body provided with the plugged portions through one open end of the body by solid-gas two-phase flows, whereby the aggregate particles are deposited on surface layer portions of partition walls on a fluid inflow side. For example, a method of supplying the aggregate particles constituting the collecting layers by the solid-gas two-phase flows to deposit the particles can be performed by allowing air including the aggregate particles to flow into the honeycomb formed body provided with the plugged portions through the one open end of the body. Furthermore, another end of the body can be sucked, to introduce the aggregate particles constituting the collecting layers into pores of the partition walls, thereby further stabilizing a deposited state. Subsequently, the body can be heat-treated at about 1000 to 1500° C. to form the collecting layers. It is to be noted that the porosity, peak pore diameter and thickness of the collecting layers can easily be regulated in accordance with the amount or average particle diameter of the aggregate particles, or a suction flow rate.

Next, the end aggregate layers are formed. There is not any special restriction on a method of forming the end aggregate layers, and the end aggregate layers can be formed by a method similar to the above collecting layer forming method. However, from the viewpoint of the simplification of the manufacturing steps, the end aggregate layers are preferably formed simultaneously with the collecting layers. That is, the end aggregate layers having a desirable thickness can be formed in accordance with regulating easily the amount or average particle diameter of the aggregate particles, or the suction flow rate while forming the collecting layers.

The amount of the aggregate particles is preferably from 4 to 17 g/L, and further preferably from 4 to 14 g/L. This unit g/L indicates the amount of the aggregate particles forming the collecting layers and the end aggregate layers with respect to the volume of the honeycomb formed body. If the amount of the aggregate particles is smaller than 4 g/L, the collecting layers and end aggregate layers having sufficient thicknesses are not formed sometimes. On the other hand, if the amount is larger than 17 g/L, the thicknesses of the collecting layers and the end aggregate layers increase. Therefore, owing to the increase of penetration resistance of the collecting layers themselves, or the decrease of the filtering area, the pressure drop of the honeycomb filter itself increases sometimes.

Moreover, the average particle diameter of the aggregate particles is preferably from 1 to 15 μm, and further preferably from 3 to 10 μm.

Furthermore, the suction flow rate is preferably from 30 to 500 L/min. There is not any special restriction on the suction flow rate as long as the aggregate particles can be conveyed to the end of the honeycomb formed body. If the suction flow rate is excessively small, the aggregate particles fall down, whereby the collecting layers or the end aggregate layers become uneven sometimes, or manufacturing time lengthens sometimes. On the other hand, if the suction flow rate is excessively large, there occurs a problem such as generation of a part where any collecting layer is not formed.

In consequence, the honeycomb formed body can be provided with the plugged portions, the porous collecting layers and the end aggregate layers to manufacture a honeycomb filter (wherein a case where the honeycomb basal body is a honeycomb segment is excluded). It is to be noted that the manufactured honeycomb filter may be processed into a desirable shape by grinding, and the processed surface thereof may be coated with an outer peripheral coat layer.

When the honeycomb formed body is the honeycomb segment, a plurality of honeycomb formed body are prepared, a joining slurry is applied to the outer wall of each body, and the body are joined to one another, pressed, heated, and then dried, to obtain a joined body entirely having a quadrangular post-like shape. The obtained joined body can be processed into a desirable shape by grinding. Afterward, the processed surface of the body is coated with an outer peripheral coat layer, and the body can be dried to harden, thereby manufacturing the honeycomb filter having a desirable shape. As the joining slurry, for example, a slurry obtained by mixing and kneading the composition made of an inorganic fiber, an inorganic binder, an organic binder and inorganic particles may be used.

Moreover, the outer peripheral coat layer can be formed by applying, drying and firing an outer peripheral coating slurry. As the outer peripheral coating slurry, a slurry similar to the joining slurry may be used.

EXAMPLES

Hereinafter, the present invention will further specifically be described with respect to examples, but the present invention is not limited to these examples. It is to be noted that "parts" and "%" in examples and comparative examples are based on masses, unless otherwise specified. Moreover, measuring methods of various physical values and evaluation methods of various properties will also be described.

[Porosity (%) of Partition Walls]: An image of a partition wall was obtained by using a scanning electron microscope (trade name "S-3200N" manufactured by Hitachi, Ltd.), and the image was divided into a partition wall portion and a pore portion, to calculate the porosity from an area ratio of the portions.

[Average Pore Diameter (μm) of Partition Walls]: The average pore diameter was measured by mercury intrusion technique using "Porosimeter Model 9810 (trade name)" manufactured by Shimadzu Corporation.

[Thickness (μm) of Partition Walls]: The thickness was obtained by measuring the section of the partition wall by use of an image analysis device (trade name "NEXIV, VMR-1515" manufactured by Nikon Corporation).

[Cell Density (cells/cm$^2$]: The cell density was calculated by measuring a cell pitch by use of the image analysis device (trade name "NEXIV, VMR-1515" manufactured by Nikon Corporation).

[Thickness (μm) of Collecting Layers]: The thickness was measured by using the scanning electron microscope (trade name "S-3200N" manufactured by Hitachi, Ltd.).

[Thickness (mm) of End Aggregate Layers]: The thickness was measured by using a microscope (trade name "BSL-Z120, BS-D8000II" manufactured by Sonic Solutions).

[Porosity (%) of End Aggregate Layers]: An image of an end aggregate layer was obtained by using a scanning electron microscope (trade name "S-3200N" manufactured by Hitachi, Ltd.), and the image was divided into a particle portion and a pore portion, to calculate the porosity from an area ratio of the portions.

[Pressure drop (kPa)]: An exhaust gas from a light oil burner was allowed to flow into a 2.2 L engine on which a honeycomb filter was mounted at a constant flow rate of 2000 rpm×50 Nm, to deposit a PM. While measuring a pressure difference between an inflow side and an outflow side, the mass of the honeycomb filter was measured at a constant interval, to calculate the amount of the PM and measure a pressure drop.

[Regeneration Test]: After depositing a predetermined amount of the PM on the honeycomb filter in a pressure drop test, a burning gas containing oxygen at a constant ratio was allowed to flow into the honeycomb filter by post injection at 630° C. while a constant flow rate of 2000 rpm×50 Nm was set, to burn and remove the PM. In this case, the highest temperature of the honeycomb filter on an outflow side thereof and presence/absence of generation of cracks in the end face of the honeycomb filter on an outlet side thereof were confirmed. The amount of the deposited PM was successively increased, and the highest temperature of the honeycomb filter on the outflow side thereof and the presence/absence of the generation of the cracks in the end face of the honeycomb filter on the outlet side thereof were confirmed.

Example 1

As a material of a honeycomb basal body, mixed powder containing 80% of SiC powder and 20% of metal Si powder was used. To 100 parts of this mixed powder, 13 parts of pore former, 35 parts of dispersion medium, 6 parts of organic binder and 0.5 part of dispersant were added, respectively, mixed, and kneaded to prepare a clay. It is to be noted that water was used as the dispersion medium, a mixture of starch and acrylic acid based polymer resin having an average particle diameter of 10 μm was used as the pore former, hydroxypropyl methyl cellulose was used as the organic binder, and ethylene glycol was used as the dispersant, respectively. Next, the clay was extruded by using a die having a predetermined slit width for obtaining a cell shape where octagonal cells and quadrangular cells were alternately formed, to obtain a honeycomb segment having a combination of the octagonal cells and quadrangular cells as the cell shape and having a desirable dimension.

The obtained honeycomb segment was dried by a microwave drier, and further completely dried by a hot air drier. Afterward, open frontal areas of cells of the end face of the honeycomb segment were alternately provided with a mask so as to form a checkered pattern (a zigzag pattern). The end of the segment provided with the mask was immersed into a plugging slurry containing the above material of the honeycomb basal body, thereby forming plugged portions alternately arranged in the checkered pattern. The honeycomb segment having both ends provided with the plugged portions was dried by the hot air drier, calcinated under an oxidation atmosphere at 550° C. for three hours, and then fired under an Ar inert atmosphere at 1450° C. for two hours. In consequence, there was obtained the honeycomb segment having a cell density of 46.5 cells/cm$^2$, a partition wall thickness of 300 μm, an octagonal inlet cell shape, an inlet cell size of 1.33 mm, a quadrangular outlet cell shape, an outlet cell size of 0.99 mm, a partition wall average pore diameter of 14 μm, a partition wall porosity of 41% and a length of 152 mm. The honeycomb segment was provided with plugged portions having a quadrangular post-like shape with each side of 36 mm. It is to be noted that in the examples, "cell size" of each cell is a distance between opposite sides of the cell.

SiC particles having an average particle diameter of 3 μm were supplied into the honeycomb segment provided with the plugged portions through the open end thereof on a fluid inflow side at a flow rate of 7 g/L with respect to the volume of the honeycomb segment provided with the plugged portions, and the segment was sucked at a flow rate of 500 L/minute. In consequence, collecting layers were formed on surface layer portions of partition walls on a fluid inflow side, and end aggregate layers were formed on the surfaces of the plugged portions (i.e., first plugged portions) formed in another end of the honeycomb segment on the fluid inflow side. Furthermore, the segment was heat-treated under atmospheric air at 1300° C. for two hours. The collecting layers had a thickness of 45 μm, and the end aggregate layers had a thickness of 0.7 mm and a porosity of 40%.

A joining slurry was applied to the outer wall of the honeycomb segment provided with the collecting layers and the end aggregate layers. The honeycomb segments were joined to one another, pressed, heated, and dried, to form a honeycomb segment joined body entirely having a quadrangular post-like shape. As the joining slurry, there was used a slurry obtained by mixing SiC powder as inorganic particles, aluminosilicate fiber as an oxide fiber, an aqueous silica-sol solution as colloidal oxide and clay, respectively, further adding water thereto and mixing these materials by a mixer for 30 minutes. The obtained honeycomb segment joined body was processed into a columnar shape by grinding. The processed surface of the body was coated with an outer peripheral coating slurry having the same composition as a joining material layer slurry. The body was dried to harden, to manufacture a columnar honeycomb filter having a segment structure with a diameter (φ) of 144 mm and a length of 152 mm in a central axis direction. A pressure drop test and a regeneration test were performed by using the manufactured honeycomb filter. Evaluation results are shown in Table 2.

Comparative Example 1

A honeycomb filter was manufactured by a method similar to Example 1 except that a honeycomb segment which was not provided with any collecting layer or any end aggregate layer was used. It is to be noted that there was used the honeycomb segment having a cell density of 46.5 (cells/cm$^2$), a partition wall thickness of 300 μm, a partition wall average pore diameter of 14 μm and a partition wall porosity of 41% in the same manner as in Example 1. A pressure drop test and a regeneration test were performed by using the manufactured honeycomb filter. Evaluation results are shown in Table 2.

Examples 2 to 11 and Comparative Examples 2 to 8

Honeycomb filters were manufactured in the same manner as in Example 1 except that collecting layers and end aggregate layers were formed on conditions described in Table 1. It is to be noted that there was used a honeycomb segment having a cell density of 46.5 (cells/cm$^2$), a partition wall thickness of 300 μm, a partition wall average pore diameter of 14 μm and a partition wall porosity of 41% in the same manner as in Example 1. A pressure drop test and a regeneration test were performed by using the manufactured honeycomb filters. Evaluation results are shown in Table 2.

TABLE 1

| | Manufacturing conditions | | | | | | |
|---|---|---|---|---|---|---|---|
| | | Aggregate particle | | Suction flow rate | Collecting layer | End aggregate layer | |
| | Partition wall Type | Particle Type | diameter (μm) | Amount (g/L) | Suction flow rate (L/min.) | Thickness (μm) | Thickness (mm) | Porosity (%) |
| Comparative Example 1 | SiC | — | — | — | — | — | — | — |
| Comparative Example 2 | SiC | SiC | 3 | 5 | 500 | 40 | 0 | — |
| Comparative Example 3 | SiC | SiC | 3 | 5 | 50 | 55 | 0.02 | 20 |
| Comparative Example 4 | SiC | SiC | 3 | 5 | 30 | 60 | 0.04 | 45 |
| Example 1 | SiC | SiC | 3 | 7 | 500 | 45 | 0.7 | 40 |
| Example 2 | SiC | SiC | 3 | 7 | 50 | 50 | 0.85 | 45 |
| Example 3 | SiC | SiC | 3 | 7 | 30 | 55 | 0.9 | 50 |
| Example 4 | SiC | SiC | 3 | 10 | 500 | 65 | 1.4 | 45 |
| Example 5 | SiC | SiC | 3 | 10 | 50 | 70 | 2.1 | 55 |
| Example 6 | SiC | SiC | 3 | 12 | 500 | 80 | 3.5 | 60 |
| Comparative Example 5 | SiC | SiC | 3 | 12 | 50 | 85 | 5.2 | 70 |
| Comparative Example 6 | SiC | SiC | 10 | 5 | 500 | 45 | 0 | — |
| Comparative Example 7 | SiC | SiC | 10 | 5 | 50 | 50 | 0 | — |
| Example 7 | SiC | SiC | 10 | 7 | 500 | 50 | 1.2 | 50 |
| Example 8 | SiC | SiC | 10 | 7 | 50 | 55 | 2.1 | 55 |
| Example 9 | SiC | SiC | 10 | 10 | 500 | 65 | 1.8 | 55 |
| Example 10 | SiC | SiC | 10 | 10 | 50 | 70 | 2.7 | 65 |
| Example 11 | SiC | SiC | 10 | 12 | 500 | 80 | 4.2 | 60 |
| Comparative Example 8 | SiC | SiC | 10 | 12 | 50 | 85 | 6.8 | 75 |

TABLE 2

| | PM amount (g/L) Pressure drop (kPa) | | | | | | | | Regeneration test result | | | | | | | | |
|---|---|---|---|---|---|---|---|---|---|---|---|---|---|---|---|---|---|
| | 0 | 0.5 | 1 | 2 | 4 | 6 | 8 | 10 | PM amount (g/L) | Highest temperature (°C.) | Presence/ absence of cracks | PM amount (g/L) | Highest temperature (°C.) | Presence/ absence of cracks | PM amount (g/L) | Highest temperature (°C.) | Presence/ absence of cracks |
| Comp. Ex. 1 | 1.6 | 5.3 | 6.1 | 7.3 | 9.6 | 11.8 | 14.1 | 16.4 | 4 | 700 | ○ | 8 | 900 | ○ | 10 | 1050 | x |
| Comp. Ex. 2 | 1.7 | 3.5 | 4.0 | 5.0 | 7.2 | 9.4 | 11.7 | 14.0 | 4 | 700 | ○ | 8 | 900 | ○ | 10 | 1050 | x |
| Comp. Ex. 3 | 1.7 | 3.4 | 4.0 | 5.0 | 7.2 | 9.4 | 11.7 | 14.0 | 4 | 700 | ○ | 8 | 900 | ○ | 10 | 1050 | x |
| Comp. Ex. 4 | 1.7 | 3.4 | 3.9 | 4.9 | 7.1 | 9.4 | 11.6 | 13.9 | 4 | 700 | ○ | 8 | 900 | ○ | 10 | 1040 | x |
| Ex. 1 | 1.8 | 3.5 | 4.0 | 5.0 | 7.2 | 9.4 | 11.7 | 14.0 | 4 | 700 | ○ | 8 | 890 | ○ | 10 | 1000 | ○ |
| Ex. 2 | 1.8 | 3.5 | 4.1 | 5.0 | 7.2 | 9.5 | 11.7 | 14.0 | 4 | 700 | ○ | 8 | 890 | ○ | 10 | 1000 | ○ |
| Ex. 3 | 1.8 | 3.5 | 4.1 | 5.1 | 7.2 | 9.5 | 11.8 | 14.1 | 4 | 690 | ○ | 8 | 870 | ○ | 10 | 990 | ○ |
| Ex. 4 | 1.9 | 3.6 | 4.1 | 5.1 | 7.3 | 9.5 | 11.8 | 14.1 | 4 | 690 | ○ | 8 | 870 | ○ | 10 | 980 | ○ |
| Ex. 5 | 1.9 | 3.6 | 4.1 | 5.1 | 7.3 | 9.6 | 11.8 | 14.2 | 4 | 680 | ○ | 8 | 850 | ○ | 10 | 970 | ○ |
| Ex. 6 | 2.0 | 3.7 | 4.2 | 5.2 | 7.4 | 9.6 | 12.0 | 14.4 | 4 | 680 | ○ | 8 | 850 | ○ | 10 | 970 | ○ |
| Comp. Ex. 5 | 2.0 | 3.7 | 4.2 | 5.2 | 7.4 | 9.7 | 12.1 | 15.3 | 4 | 680 | ○ | 8 | 840 | ○ | 10 | 950 | ○ |
| Comp. Ex. 6 | 1.6 | 3.6 | 4.1 | 5.1 | 7.3 | 9.5 | 11.7 | 14.1 | 4 | 700 | ○ | 8 | 900 | ○ | 10 | 1050 | x |
| Comp. Ex. 7 | 1.7 | 3.5 | 4.0 | 5.0 | 7.2 | 9.3 | 11.7 | 14.0 | 4 | 700 | ○ | 8 | 900 | ○ | 10 | 1050 | x |
| Ex. 7 | 1.7 | 3.4 | 3.9 | 4.9 | 7.1 | 9.3 | 11.6 | 13.9 | 4 | 700 | ○ | 8 | 900 | ○ | 10 | 1000 | ○ |
| Ex. 8 | 1.7 | 3.4 | 3.9 | 4.9 | 7.1 | 9.2 | 11.6 | 13.9 | 4 | 700 | ○ | 8 | 890 | ○ | 10 | 990 | ○ |
| Ex. 9 | 1.8 | 3.5 | 4.0 | 5.0 | 7.2 | 9.4 | 11.7 | 14.0 | 4 | 690 | ○ | 8 | 870 | ○ | 10 | 960 | ○ |
| Ex. 10 | 1.8 | 3.5 | 4.0 | 5.0 | 7.2 | 9.4 | 11.7 | 14.1 | 4 | 680 | ○ | 8 | 860 | ○ | 10 | 950 | ○ |
| Ex. 11 | 1.8 | 3.6 | 4.0 | 5.1 | 7.2 | 9.5 | 11.7 | 14.1 | 4 | 670 | ○ | 8 | 840 | ○ | 10 | 940 | ○ |
| Comp. Ex. 8 | 1.8 | 3.6 | 4.0 | 5.1 | 7.3 | 9.5 | 11.8 | 14.6 | 4 | 660 | ○ | 8 | 830 | ○ | 10 | 930 | ○ |

As seen in Table 2, in the honeycomb filter provided with end aggregate layers having a thickness of 0.5 to 5 mm, any crack was not generated in the regeneration test even if the amount of deposited PM was 10 g/L or more (Examples 1 to 11). On the other hand, in the honeycomb filter provided with end aggregate layers having a thickness of 5 mm or more, as the amount of the deposited PM increased to 10 g/L or more, any crack was not generated, but the pressure drop rapidly increased (Comparative Examples 5 and 8). Moreover, in the honeycomb filter provided with end aggregate layers having a thickness of 0.5 mm or less or the honeycomb filter which was not provided with any end aggregate layer, when the amount of the deposited PM was 10 g/L or more, cracks were generated (Comparative Examples 2 to 4, 6 and 7). It is to be noted that in the honeycomb filter which was not provided with any collecting layer in addition to any end aggregate layer, an initial (the amount of the deposited PM was from 0 to 1 g/L) pressure drop remarkably increased. Moreover, in a case where the regeneration test was performed when the amount of the deposited PM was 10 g/L, cracks were generated in the end face of the filter on an outlet side (Comparative Example 1).

Examples 12 to 21 and Comparative Examples 10 to 16

The average particle diameter of SiC powder for use as the material of a honeycomb basal body and the amount of a pore former to be added were regulated, to obtain a honeycomb segment including partition walls having an average pore diameter of 23 μm, a porosity of 58% and a thickness of 300 μm, and having a cell density of 46.5 cells/cm². By use of this honeycomb segment, honeycomb filters were manufactured in the same manner as in Example 1 except that collecting layers and end aggregate layers were formed on conditions described in Table 3. A pressure drop test and a regeneration test were performed by using the manufactured honeycomb filters. Evaluation results are shown in Table 4.

Comparative Example 9

Honeycomb filters were manufactured in the same manner as in Examples 12 to 21 and Comparative Examples 10 to 16 except that honeycomb segments which were not provided with any collecting layer or any end aggregate layer were used. It is to be noted that in the same manner as in Examples 12 to 21 and Comparative Examples 10 to 16, the honeycomb segments having a cell density of 46.5 cells/cm² and including partition walls having a thickness of 300 μm, an average pore diameter of 23 μm and a porosity of 58% were used. A pressure drop test and a regeneration test were performed by using the manufactured honeycomb filters. Evaluation results are shown in Table 4.

TABLE 3

| | Manufacturing conditions | | | | | | |
|---|---|---|---|---|---|---|---|
| | | Aggregate particle | | Suction flow rate | Collecting layer | End aggregate layer | |
| | Partition wall Type | Type | Particle diameter (μm) | Amount (g/L) | Suction flow rate (L/min.) | Thickness (μm) | Thickness (mm) | Porosity (%) |
| Comparative Example 9 | SiC | — | — | — | — | — | — | — |
| Comparative Example 10 | SiC | SiC | 3 | 7 | 500 | 40 | 0 | — |
| Comparative Example 11 | SiC | SiC | 3 | 7 | 50 | 45 | 0.02 | 20 |
| Example 12 | SiC | SiC | 3 | 10 | 500 | 60 | 0.8 | 45 |
| Example 13 | SiC | SiC | 3 | 10 | 50 | 65 | 1.5 | 50 |
| Example 14 | SiC | SiC | 3 | 10 | 30 | 70 | 2.1 | 60 |
| Example 15 | SiC | SiC | 3 | 14 | 500 | 70 | 1.3 | 50 |
| Example 16 | SiC | SiC | 3 | 14 | 50 | 75 | 2.1 | 60 |
| Example 17 | SiC | SiC | 3 | 14 | 30 | 80 | 2.8 | 70 |
| Comparative Example 12 | SiC | SiC | 3 | 17 | 500 | 80 | 5.9 | 65 |
| Comparative Example 13 | SiC | SiC | 3 | 17 | 50 | 85 | 7.2 | 70 |
| Comparative Example 14 | SiC | SiC | 10 | 7 | 500 | 30 | 0 | — |
| Example 18 | SiC | SiC | 10 | 10 | 500 | 50 | 1.2 | 50 |
| Example 19 | SiC | SiC | 10 | 10 | 50 | 55 | 3.1 | 55 |
| Example 20 | SiC | SiC | 10 | 14 | 500 | 60 | 2.8 | 55 |
| Example 21 | SiC | SiC | 10 | 14 | 50 | 65 | 4.2 | 60 |
| Comparative Example 15 | SiC | SiC | 10 | 17 | 500 | 65 | 6.3 | 65 |
| Comparative Example 16 | SiC | SiC | 10 | 17 | 50 | 70 | 7.8 | 75 |

TABLE 4

| | PM amount (g/L) | | | | | | | | Regeneration test result | | | | | | | | |
|---|---|---|---|---|---|---|---|---|---|---|---|---|---|---|---|---|---|
| | 0 | 0.5 | 1 | 2 | 4 | 6 | 8 | 10 | PM amount (g/L) | Highest temperature (° C.) | Presence/ absence of cracks | PM amount (g/L) | Highest temperature (° C.) | Presence/ absence of cracks | PM amount (g/L) | Highest temperature (° C.) | Presence/ absence of cracks |
| | | | | Pressure drop (kPa) | | | | | | | | | | | | | |
| Comp. Ex. 9 | 1.4 | 3.7 | 4.2 | 5.0 | 6.8 | 8.8 | 10.8 | 12.8 | 4 | 750 | ○ | 8 | 960 | ○ | 10 | 1150 | x |
| Comp. Ex. 10 | 1.4 | 3.0 | 3.5 | 4.2 | 5.8 | 7.5 | 9.0 | 10.8 | 4 | 750 | ○ | 8 | 960 | ○ | 10 | 1150 | x |
| Comp. Ex. 11 | 1.4 | 3.0 | 3.4 | 4.2 | 5.8 | 7.4 | 9.0 | 10.7 | 4 | 750 | ○ | 8 | 960 | ○ | 10 | 1130 | x |
| Ex. 12 | 1.4 | 2.8 | 3.3 | 4.1 | 5.7 | 7.3 | 8.9 | 10.6 | 4 | 740 | ○ | 8 | 950 | ○ | 10 | 1010 | ○ |
| Ex. 13 | 1.4 | 2.8 | 3.3 | 4.1 | 5.7 | 7.4 | 9.0 | 10.6 | 4 | 740 | ○ | 8 | 950 | ○ | 10 | 1010 | ○ |
| Ex. 14 | 1.4 | 2.8 | 3.3 | 4.2 | 5.7 | 7.4 | 9.0 | 10.6 | 4 | 740 | ○ | 8 | 940 | ○ | 10 | 1000 | ○ |
| Ex. 15 | 1.5 | 2.9 | 3.4 | 4.2 | 5.8 | 7.4 | 9.0 | 10.7 | 4 | 730 | ○ | 8 | 940 | ○ | 10 | 1010 | ○ |
| Ex. 16 | 1.5 | 2.9 | 3.4 | 4.2 | 5.9 | 7.4 | 9.0 | 10.8 | 4 | 730 | ○ | 8 | 940 | ○ | 10 | 1000 | ○ |
| Ex. 17 | 1.5 | 3.0 | 3.5 | 4.3 | 5.9 | 7.4 | 9.0 | 10.8 | 4 | 730 | ○ | 8 | 940 | ○ | 10 | 990 | ○ |
| Comp. Ex. 12 | 1.6 | 3.0 | 3.5 | 4.3 | 5.8 | 7.5 | 9.1 | 11.2 | 4 | 730 | ○ | 8 | 930 | ○ | 10 | 980 | ○ |
| Comp. Ex. 13 | 1.6 | 3.0 | 3.6 | 4.4 | 5.9 | 7.6 | 9.2 | 11.7 | 4 | 720 | ○ | 8 | 920 | ○ | 10 | 970 | ○ |
| Comp. Ex. 14 | 1.4 | 2.9 | 3.3 | 4.3 | 5.8 | 7.3 | 9.0 | 10.7 | 4 | 750 | ○ | 8 | 960 | ○ | 10 | 1150 | x |
| Ex. 18 | 1.4 | 2.8 | 3.3 | 4.2 | 5.7 | 7.3 | 9.0 | 10.6 | 4 | 740 | ○ | 8 | 950 | ○ | 10 | 1000 | ○ |
| Ex. 19 | 1.4 | 2.8 | 3.3 | 4.1 | 5.7 | 7.2 | 8.9 | 10.6 | 4 | 740 | ○ | 8 | 950 | ○ | 10 | 1000 | ○ |
| Ex. 20 | 1.5 | 2.8 | 3.3 | 4.1 | 5.7 | 7.3 | 8.9 | 10.6 | 4 | 730 | ○ | 8 | 940 | ○ | 10 | 990 | ○ |
| Ex. 21 | 1.5 | 2.8 | 3.4 | 4.1 | 5.8 | 7.3 | 8.9 | 10.7 | 4 | 720 | ○ | 8 | 930 | ○ | 10 | 980 | ○ |
| Comp. Ex. 15 | 1.6 | 2.9 | 3.5 | 4.2 | 5.9 | 7.4 | 9.1 | 11.1 | 4 | 720 | ○ | 8 | 920 | ○ | 10 | 970 | ○ |
| Comp. Ex. 16 | 1.6 | 3.0 | 3.5 | 4.2 | 6.0 | 7.5 | 9.2 | 11.6 | 4 | 720 | ○ | 8 | 910 | ○ | 10 | 960 | ○ |

As seen from Table 4, even in a case where the porosity and average pore diameter of the honeycomb segment changed, in the honeycomb filter provided with end aggregate layers having a thickness of 0.5 to 5 mm, any crack was not generated in the regeneration test even if the amount of the deposited PM was 10 g/L or more (Examples 12 to 21). On the other hand, in the honeycomb filter provided with end aggregate layers having a thickness of 5 mm or more, as the amount of the deposited PM increased to 10 g/L or more, any crack was not generated, but a pressure drop rapidly increased (Comparative Examples 12, 13, 15, and 16). Moreover, in the honeycomb filter provided with end aggregate layer having a thickness of 0.5 mm or less or the honeycomb filter which was not provided with any end aggregate layer, when the amount of the deposited PM was 10 g/L or more, cracks were generated (Comparative Examples 10, 11, and 14). It is to be noted that in the honeycomb filter which was not provided with any collecting layer in addition to any end aggregate layer, an initial (the amount of the deposited PM was from 0 to 1 g/L) pressure drop remarkably increased. Moreover, in a case where the regeneration test was performed when the amount of the deposited PM was 10 g/L, cracks were generated in the end face of the filter on an outlet side (Comparative Example 9).

Example 22

100 parts of cordierite forming raw material obtained by mixing alumina, aluminum hydroxide, kaolin, talc and silica, 13 parts of coke having an average particle diameter of 10 μm as a pore former, 35 parts of water as a dispersion medium, 6 parts of hydroxypropyl methyl cellulose as an organic binder and 0.5 part of ethylene glycol as a dispersant were mixed and kneaded to prepare a clay. Subsequently, the clay was extruded by using a die having a predetermined slit width for obtaining a cell shape where octagonal cells and quadrangular cells were alternately formed, to obtain a honeycomb basal body having a combination of the octagonal cells and quadrangular cells as the cell shape and entirely having a columnar (cylindrical) shape. The obtained honeycomb basal body was dried by a microwave drier, and further completely dried by a hot air drier. Afterward, open frontal areas of cells of the end face of the honeycomb basal body were alternately provided with a mask so as to form a checkered pattern (a zigzag pattern). The end of the body provided with the mask was immersed into a plugging slurry containing the above cordierite forming raw material, and plugged portions were formed and alternately arranged in the checkered pattern. The honeycomb basal body having both ends provided with the plugged portions was dried, and fired under atmospheric air at 1430° C. for ten hours. In consequence, there was obtained the honeycomb basal body having a cell density of 46.5 cells/cm$^2$, a partition wall thickness of 300 μm, an octagonal inlet cell shape, an inlet cell size of 1.33 mm, a quadrangular outlet cell shape, an outlet cell size of 0.99 mm, an average pore diameter of 15 μm, a porosity of 42%, a diameter (φ) of 144 mm and a length of 152 mm in a central axis direction, and provided with plugged portions.

Cordierite particles ground to obtain an average particle diameter of 3 μm were supplied into the honeycomb basal body provided with the plugged portions through an open end thereof on a fluid inflow side at a flow rate of 4 g/L with respect to the volume of the honeycomb basal body, while the body was sucked at a flow rate of 30 L/minute. In consequence, collecting layers were formed on surface layer portions of the partition walls on the fluid inflow side, and end aggregate layers were formed on the surfaces of the plugged portions (i.e., first plugged portions) in another end of the honeycomb basal body on the fluid inflow side. Afterward, the honeycomb basal body was heat-treated under atmospheric air at 1300° C. for two hours, to manufacture a honeycomb filter. The collecting layers had a thickness of 50 μm, and the end aggregate layers had a thickness of 0.85 mm and a porosity of 45%. A pressure drop test and a regeneration test were performed by using the manufactured honeycomb filter. Evaluation results are shown in Table 6.

Examples 23 to 26 and Comparative Examples 18 to 20

Honeycomb filters were manufactured in the same manner as in Example 22 except that collecting layers and end aggregate layers were formed on conditions described in Table 5. It is to be noted that there was used a honeycomb basal body having a cell density of 46.5 cells/cm², a partition wall thickness of 300 μm, a partition wall average pore diameter of 15 μm and a partition wall porosity of 42% in the same manner as in Example 22. A pressure drop test and a regeneration test were performed by using the manufactured honeycomb filters. Evaluation results are shown in Table 6.

Comparative Example 17

A honeycomb filter was manufactured in the same manner as in Example 22 except that a honeycomb basal body which was not provided with any end aggregate layer and any collecting layer was used. It is to be noted that in the same manner as in Example 22, the honeycomb basal body having a cell density of 46.5 cells/cm² and including partition walls having a thickness of 300 μm, an average pore diameter of 15 μm and a porosity of 42% was used. A pressure drop test and a regeneration test were performed by using the manufactured honeycomb filter. Evaluation results are shown in Table 6.

TABLE 5

| | Manufacturing conditions | | | | | | |
|---|---|---|---|---|---|---|---|
| | | Aggregate particle | | | Suction flow rate | Collecting layer | End aggregate layer | |
| | Partition wall Type | Particle Type | diameter (μm) | Amount (g/L) | Suction flow rate (L/min.) | Thickness (μm) | Thickness (mm) | Porosity (%) |
| Comparative Example 17 | Cd | — | — | — | — | — | — | — |
| Comparative Example 18 | Cd | Cd | 3 | 4 | 500 | 40 | 0 | — |
| Comparative Example 19 | Cd | Cd | 3 | 4 | 50 | 45 | 0.03 | 25 |
| Example 22 | Cd | Cd | 3 | 4 | 30 | 50 | 0.85 | 45 |
| Example 23 | Cd | Cd | 3 | 8 | 500 | 50 | 1.6 | 50 |
| Example 24 | Cd | Cd | 3 | 8 | 50 | 55 | 2.1 | 55 |
| Example 25 | Cd | Cd | 3 | 8 | 30 | 60 | 2.9 | 60 |
| Example 26 | Cd | Cd | 3 | 12 | 500 | 60 | 3.2 | 55 |
| Comparative Example 20 | Cd | Cd | 3 | 12 | 50 | 70 | 5.1 | 65 |

TABLE 6

| | PM amount (g/L) | | | | | | | | Regeneration test result | | | | | | | | |
|---|---|---|---|---|---|---|---|---|---|---|---|---|---|---|---|---|---|
| | 0 | 0.5 | 1 | 2 | 4 | 6 | 8 | 10 | PM amount (g/L) | Highest temperature (° C.) | Presence/absence of cracks | PM amount (g/L) | Highest temperature (° C.) | Presence/absence of cracks | PM amount (g/L) | Highest temperature (° C.) | Presence/absence of cracks |
| | Pressure drop (kPa) | | | | | | | | | | | | | | | | |
| Comp. Ex. 17 | 1.9 | 6.9 | 7.9 | 9.0 | 11.1 | 13.1 | 15.1 | — | 4 | 730 | ○ | 6 | 830 | ○ | 8 | 940 | x |
| Comp. Ex. 18 | 2.1 | 4.1 | 4.7 | 5.8 | 7.7 | 9.7 | 11.7 | — | 4 | 730 | ○ | 6 | 830 | ○ | 8 | 940 | x |
| Comp. Ex. 19 | 2.2 | 4.1 | 4.8 | 5.8 | 7.7 | 9.7 | 11.7 | — | 4 | 730 | ○ | 6 | 830 | ○ | 8 | 940 | x |
| Ex. 22 | 2.2 | 4.2 | 4.8 | 5.8 | 7.8 | 9.8 | 11.8 | — | 4 | 720 | ○ | 6 | 820 | ○ | 8 | 920 | ○ |
| Ex. 23 | 2.4 | 4.3 | 4.9 | 6.0 | 7.9 | 9.9 | 11.9 | — | 4 | 710 | ○ | 6 | 810 | ○ | 8 | 920 | ○ |
| Ex. 24 | 2.4 | 4.3 | 5.0 | 6.0 | 8.0 | 9.9 | 11.9 | — | 4 | 710 | ○ | 6 | 810 | ○ | 8 | 920 | ○ |
| Ex. 25 | 2.5 | 4.4 | 5.0 | 6.1 | 8.0 | 10.0 | 12.1 | — | 4 | 710 | ○ | 6 | 800 | ○ | 8 | 910 | ○ |
| Ex. 26 | 2.6 | 4.5 | 5.1 | 6.2 | 8.1 | 10.0 | 12.2 | — | 4 | 700 | ○ | 6 | 800 | ○ | 8 | 910 | ○ |
| Comp. Ex. 20 | 2.7 | 4.6 | 5.1 | 6.3 | 8.2 | 10.2 | 13.4 | — | 4 | 700 | ○ | 6 | 800 | ○ | 8 | 900 | ○ |

As seen in Table 6, even in a case where a honeycomb basal body is made of cordierite, in the honeycomb filter provided with end aggregate layers having a thickness of 0.5 to 5 mm, any crack was not generated in the regeneration test even if the amount of deposited PM was 8 g/L or more (Examples 22 to 26). On the other hand, in the honeycomb filter provided with end aggregate layers having a thickness of 5 mm or more, as the amount of the deposited PM increased to 8 g/L or more, any crack was not generated, but the pressure drop rapidly increased (Comparative Example 20). Moreover, in the honeycomb filter provided with end aggregate layers having a thickness of 0.5 mm or less or the honeycomb filter which was not provided with any end aggregate layer, when the amount of the deposited PM was 8 g/L or more, cracks were generated (Comparative Examples 18 and 19). It is to be noted that in the honeycomb filter which was not provided with any collecting layer in addition to any end aggregate layer, an initial (the amount of the deposited PM was from 0 to 1 g/L) pressure drop remarkably increased. Moreover, in a case where the regeneration test was performed when the amount of the deposited PM was 8 g/L, cracks were generated in the end face of the filter on an outlet side (Comparative Example 17).

A honeycomb filter of the present invention can preferably be used to collect a particulate matter included in an exhaust gas discharged from an internal combustion engine typified by a diesel engine, an engine for an ordinary car or an engine for a large-sized vehicle such as a truck or a bus, or various combustion apparatuses, or to purify the exhaust gas.

DESCRIPTION OF REFERENCE NUMERALS 1, 11 and 21: honeycomb filter, 2 and 12: honeycomb basal body, 23a: first plugged portion, 3b, 13b, and 23b: second plugged portion, 4a, 14a, and 24a: inflow cell, 24b: outflow cell, 24: cell, 5a, 15a, and 25a: another end, 5b, 15b, and 25b: one end, 6, 16, and 26: partition wall, 10: cell structure, 17: outer wall, 18: honeycomb segment, 28: collecting layer, and 29: end aggregate layer.

What is claimed is:

1. A honeycomb filter comprising: a honeycomb basal body including porous partition walls arranged to form a plurality of cells disposed in parallel with one another and including inflow cells into which a fluid flows and outflow cells which are formed adjacent to the inflow cells and out of which the fluid flows; first plugged portions with which one end of each of the inflow cells is plugged; second plugged portions with which another end of each of the outflow cells is plugged; porous collecting layers formed on the surfaces of the partition walls on the side of the inflow cells; and end aggregate layers made of a particulate aggregate material and formed on the surfaces of the first plugged portions on the side of the inflow cells, wherein a thickness of the end aggregate layers is from 0.5 to 5 ram, wherein the honeycomb basal body, first plugged portions and second plugged portions are sintered together at a sintering temperature, and the collecting layers and end aggregate layers are formed thereon and heat treated at a temperature lower than the sintering temperature.

2. The honeycomb filter according to claim 1, wherein a porosity of the end aggregate layers is from 30 to 75%.

3. The honeycomb filter according to claim 1, wherein the honeycomb basal body comprises a joined member comprising a plurality of honeycomb segments each including a cell structure having the porous partition walls arranged to form the plurality of cells and an outer wall disposed in an outer periphery of the cell structure, and is a joined body of the honeycomb segments which are joined at the adjacent outer walls joined one another.

4. The honeycomb filter according to claim 2, wherein the honeycomb basal body comprises a joined member comprising a plurality of honeycomb segments each including a cell structure having the porous partition walls arranged to form the plurality of cells and an outer wall disposed in an outer periphery of the cell structure, and is a joined body of the honeycomb segments which are joined at the adjacent outer walls joined one another.

* * * * *